Figure 1:
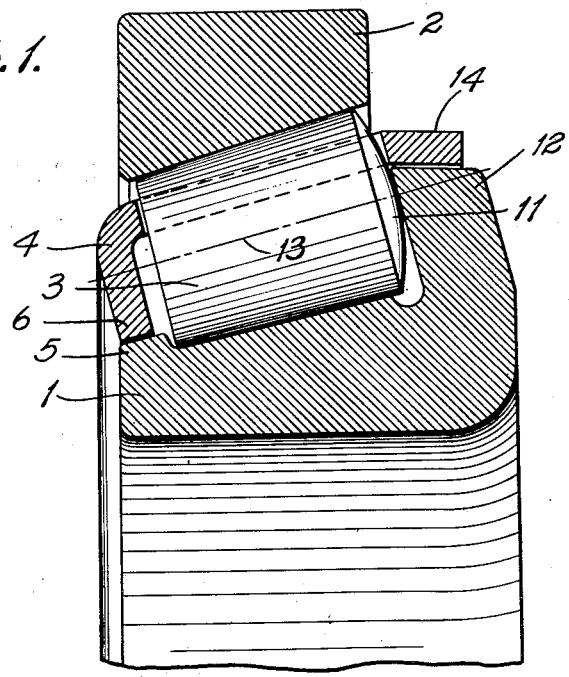

Jan. 12, 1932.   W. L. SCRIBNER   1,840,607
ROLLER BEARING AND CAGE
Filed Aug. 13, 1930

INVENTOR:
William L. Scribner,
by Cantlan & Gravely,
HIS ATTORNEYS.

Patented Jan. 12, 1932

1,840,607

UNITED STATES PATENT OFFICE

WILLIAM L. SCRIBNER, OF CANTON, OHIO, ASSIGNOR TO THE TIMKEN ROLLER BEARING COMPANY, OF CANTON, OHIO, A CORPORATION OF OHIO

ROLLER BEARING AND CAGE

Application filed August 13, 1930. Serial No. 475,006.

My invention relates to roller bearings and cages, particularly conical roller bearings of the type wherein the cage is guided at each end on the inner bearing member. It has for its principal object a bearing and cage of this general type in which the cage is accurately guided and is simple and inexpensive to manufacture. The invention consists principally in providing the inner bearing member with a rib at one end for supporting and guiding one end of the cage. The invention further consists in the roller bearing and cage and in the parts and combinations and arrangements of parts hereinafter described and claimed. In the accompanying drawings, Fig. 1 is a sectional view of a roller bearing and cage embodying my invention, and Fig. 2 is a similar view of a modified form of the invention.

The bearing embodying my invention comprises a cone or inner bearing member 1, a cup or outer bearing member 2, conical rollers 3 therebetween and a cage 4 of generally conical form for supporting said rollers. The cone has a small rib 5 at its small end to prevent the rollers from being removed from the cone after the cage 4 has been closed in and the cage has an inturned annular flange 6 at its small end that closely encircles the outer periphery of said small rib 5, whereby the small end of the cage is guided.

In the construction illustrated in Fig. 1, the rollers 3 have convexly curved ends 11 and the cone 1 has an enlarged rib 12 at its large end that projects beyond the circle defined by the axes 13 of the rollers. The outer periphery of said rib 12 is substantially cylindrical and is closely encircled by the substantially cylindrical large end ring 14 of the cage. Thus the cage is guided at both ends.

Figure 2:
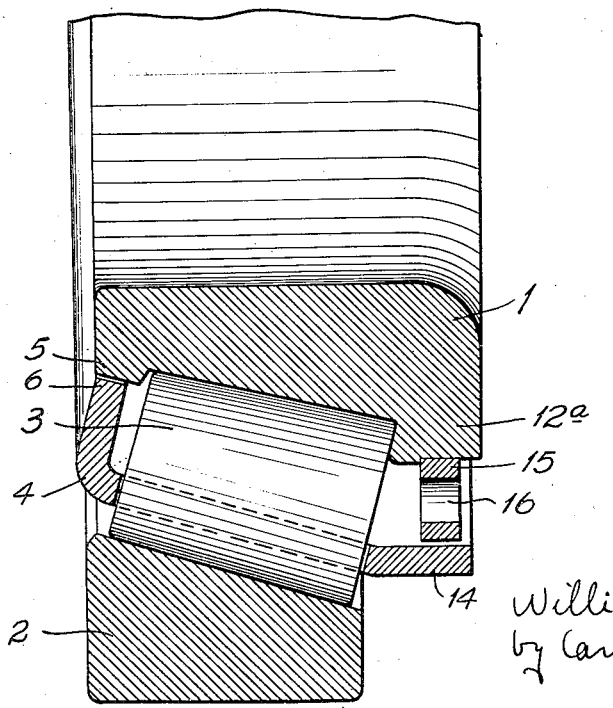

In the modified form of the invention shown in Fig. 2, the thrust rib 12a is the usual comparatively low rib and the thrust ends of the rollers 3 are susbtantially flat. Secured to the thrust rib 12a in any suitable way (as by welding or shrinking it thereon or snapping it into a retaining groove) is a ring 15 that extends beyond the circle defined by the axes of the rollers. The periphery of said ring 15 forms the cylindrical guiding surface required by the substantially cylindrical large end ring of the cone. The ring may be provided with a multiplicity of openings 16 therethrough to permit passage of lubricant. The above described construction has the important advantage of accurately alining the cage and it is a construction that can be easily made and that is comparatively inexpensive. The cage making process is particularly simple and economical since it eliminates the inturned ring usually required at the large end of a cage that cooperates with an alining portion of the inner bearing member. The construction shown in Fig. 2 has the important advantage of keeping down the cost of the cone and the alining ring may be easily secured in place and may be provided with openings facilitating lubrication of the large end of the bearing.

What I claim is:

1. A roller bearing comprising a circular series of conical rollers, an inner bearing member therefor, said inner bearing member having a low rib at its small end and a thrust rib at its large end, said thrust rib having a ring secured thereto and projecting radially beyond the circle defined by the axes of the rollers and a guiding cage for said rollers, said cage having an inturned flange at one end closely encircling said low rib and a cylindrical end ring at the other end closely encircling said ring on said thrust rib.

2. A roller bearing comprising a circular series of conical rollers, an inner bearing member therefor, said inner bearing member having a low rib at its small end and a thrust rib at its large end, said thrust rib having a ring secured thereto and projecting radially beyond the circle defined by the axes of the rollers, said ring having a plurality of perforations and a guiding cage for said rollers, said cage having an inturned flange at one end closely encircling said low rib and a cylindrical end ring at the other end closely encircling said ring on said thrust rib.

Signed at Canton, Ohio, this 8 day of Aug. 1930.

WILLIAM L. SCRIBNER.